(12) United States Patent
Himmel et al.

(10) Patent No.: US 9,395,214 B2
(45) Date of Patent: Jul. 19, 2016

(54) OPTICAL POSITION-MEASURING DEVICE

(71) Applicant: DR. JOHANNES HEIDENHAIN GmbH, Traunreut (DE)

(72) Inventors: Mario Himmel, Jena (DE); Jarno Waetzig, Buergel (DE); Thomas Juenemann, Erfurt (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 105 days.

(21) Appl. No.: 14/079,666

(22) Filed: Nov. 14, 2013

(65) Prior Publication Data

US 2014/0146326 A1    May 29, 2014

(30) Foreign Application Priority Data

Nov. 26, 2012    (DE) .......................... 10 2012 221 566

(51) Int. Cl.
| | |
|---|---|
| *G01D 5/26* | (2006.01) |
| *G01D 5/32* | (2006.01) |
| *G01D 5/347* | (2006.01) |

(52) U.S. Cl.
CPC .............. *G01D 5/347* (2013.01); *G01D 5/266* (2013.01); *G01D 5/34784* (2013.01); *G01D 5/26* (2013.01); *G01D 5/32* (2013.01)

(58) Field of Classification Search
CPC .... G01D 5/266; G01D 5/347; G01D 5/34784
USPC ...................... 356/237.1–241.6, 242.1–243.8, 356/426–431, 600–640
See application file for complete search history.

(56) References Cited

U.S. PATENT DOCUMENTS

| | | | | |
|---|---|---|---|---|
| 4,332,473 A | * | 6/1982 | Ono ......................... | G01D 5/38 250/237 G |
| 4,371,264 A | * | 2/1983 | Lacombat et al. ............ | 356/509 |
| 4,573,000 A | * | 2/1986 | Nelle ................... | G01D 5/2457 250/237 G |
| 4,675,727 A | * | 6/1987 | Sekizawa et al. ............. | 358/533 |
| 5,004,348 A | * | 4/1991 | Magome ....................... | 356/401 |
| 5,114,236 A | * | 5/1992 | Matsugu ............... | G03F 9/7076 250/548 |
| 5,161,051 A | * | 11/1992 | Whitney et al. ............... | 359/351 |
| 5,175,697 A | * | 12/1992 | Kawagoe ................... | G01J 3/28 356/320 |
| 5,341,211 A | | 8/1994 | Prinzhausen et al. | |

(Continued)

FOREIGN PATENT DOCUMENTS

| | | |
|---|---|---|
| DE | 3334398 C1 | 11/1984 |
| EP | 1695391 B1 | 8/2006 |

(Continued)

*Primary Examiner* — Tri Ton
*Assistant Examiner* — Jarreas C Underwood
(74) *Attorney, Agent, or Firm* — Leydig, Voit & Mayer, Ltd.

(57) ABSTRACT

An optical position-measuring device includes a measuring standard having a first grating in a form of a periodic incremental graduation and an absolute mark. A scanning unit is displaceable relative to the measuring standard in a measuring direction. The scanning unit has at least one second grating disposed at a scanning distance from the first grating. A first detector array is configured to obtain a first scanning signal for purposes of position determination in which the gratings are illuminated with light of a first wavelength. A second detector array is configured to obtain a second scanning signal for purposes of position determination in which the absolute mark is illuminated with light of a second wavelength. The first wavelength is shorter than the second wavelength.

12 Claims, 4 Drawing Sheets

(56) References Cited

U.S. PATENT DOCUMENTS

| | | | |
|---|---|---|---|
| 5,672,520 A * | 9/1997 | Natsume | G03F 7/70633 257/E21.53 |
| 5,812,629 A * | 9/1998 | Clauser | A61B 6/032 378/37 |
| 5,886,519 A | 3/1999 | Masreliez et al. | |
| 6,657,216 B1 * | 12/2003 | Poris | G01B 11/0608 250/216 |
| 6,674,572 B1 * | 1/2004 | Scheruebl | G02B 21/0024 356/237.5 |
| 6,838,688 B2 * | 1/2005 | Aoki | G01D 5/34715 250/231.14 |
| 6,879,014 B2 * | 4/2005 | Wagner et al. | 257/458 |
| 6,982,793 B1 * | 1/2006 | Yang | G03F 9/7076 356/401 |
| 7,046,361 B1 * | 5/2006 | Yang | G03F 7/70633 356/401 |
| 7,339,738 B1 * | 3/2008 | Carr | G02B 26/0808 359/291 |
| 7,348,546 B2 * | 3/2008 | Schoser | G01D 5/34746 250/231.13 |
| 7,573,581 B2 * | 8/2009 | Holzapfel | 356/499 |
| 7,608,813 B1 | 10/2009 | Milvich et al. | |
| 7,974,172 B2 * | 7/2011 | Eizumi et al. | 369/109.02 |
| 8,755,487 B2 * | 6/2014 | Kaneko et al. | 378/62 |
| 8,842,294 B2 * | 9/2014 | Minoda | G03F 7/0002 356/399 |
| 2002/0126279 A1 * | 9/2002 | Kung | G01J 3/02 356/328 |
| 2004/0174536 A1 * | 9/2004 | Jourlin | G02B 5/1847 356/521 |
| 2006/0001861 A1 * | 1/2006 | Wegmann | 356/124 |
| 2007/0278486 A1 * | 12/2007 | Speckbacher | G01D 5/34707 257/53 |
| 2008/0297809 A1 * | 12/2008 | Holzapfel et al. | 356/614 |
| 2010/0067350 A1 * | 3/2010 | Eizumi et al. | 369/112.03 |

FOREIGN PATENT DOCUMENTS

| | | |
|---|---|---|
| EP | 2395328 A2 | 12/2011 |
| WO | WO 9104460 A1 | 4/1991 |

* cited by examiner

OPTICAL POSITION-MEASURING DEVICE

CROSS-REFERENCE TO PRIOR APPLICATION

Priority is claimed to German Patent Application No. DE 10 2012 221 566.2, filed on Nov. 26, 2012, the entire disclosure of which is hereby incorporated by reference herein.

FIELD

The present invention relates to an optical position-measuring device having a measuring standard and a scanning unit displaceable relative thereto in a measuring direction. This position-measuring device may be designed to measure linear or rotary movements.

BACKGROUND

Incremental position-measuring devices which have proven effective are those where the measuring standard has a first grating in the form of a periodic incremental graduation, and where the scanning unit has at least one second grating disposed at a defined scanning distance from the grating of the measuring standard. For purposes of position measurement, the two gratings are illuminated with light of a particular wavelength, and a first detector array obtains a position-dependent electrical scanning signal therefrom.

A position-measuring device of this type is described, for example, in DE 33 34 398 C1, where incremental position measurement is complemented by absolute position measurement. In addition to the first grating, the measuring standard also includes an absolute mark, from which a second electrical scanning signal is generated by a second detector array, the second electrical scanning signal uniquely defining an absolute position within a measurement range.

The scanning distance of the first and second gratings is selected so as to achieve as high a degree of modulation as possible, and thus a high signal amplitude. Optimum scanning distances for incremental position measurement lie in the so-called Talbot planes. In the Talbot planes, repeating self-images of the first grating are formed, so that a periodic intensity distribution is obtained in these Talbot planes. In the so-called "two-grating encoder" according to DE 33 34 398 C1, the images of the first grating, which is illuminated by a plane wavefront, are formed in Talbot planes at the following distances $L_n$ from the first grating:

$$L_n = n \times T1^2 / \lambda$$

n: an integer number 0, 1, 2, ...
T1: grating constant of the first grating
$\lambda$: wavelength of the light It is apparent that the locations of these Talbot planes, and thus the optimum scanning distances, depend, on the one hand, on the grating constant of the first grating and, on the other hand, on the wavelength of the light used.

In German Patent DE 33 34 398 C1, it was already realized that relatively large scanning distances are advantageous for incremental scanning, but disadvantageous for the scanning of the absolute mark. German Patent DE 33 34 398 C1 proposes to solve this problem by providing different scanning distances for the two types of scanning, namely by providing a larger scanning distance for incremental scanning than for the scanning of the absolute mark.

To be able to maintain the required scanning distances in this system, complex guides are proposed.

SUMMARY

In an embodiment, the present invention provides an optical position-measuring device. A measuring standard has a first grating in a form of a periodic incremental graduation and an absolute mark. A scanning unit is displaceable relative to the measuring standard in a measuring direction. The scanning unit has at least one second grating disposed at a scanning distance from the first grating. A first detector array is configured to obtain a first scanning signal for purposes of position determination in which the gratings are illuminated with light of a first wavelength. A second detector array is configured to obtain a second scanning signal for purposes of position determination in which the absolute mark is illuminated with light of a second wavelength. The first wavelength is shorter than the second wavelength.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
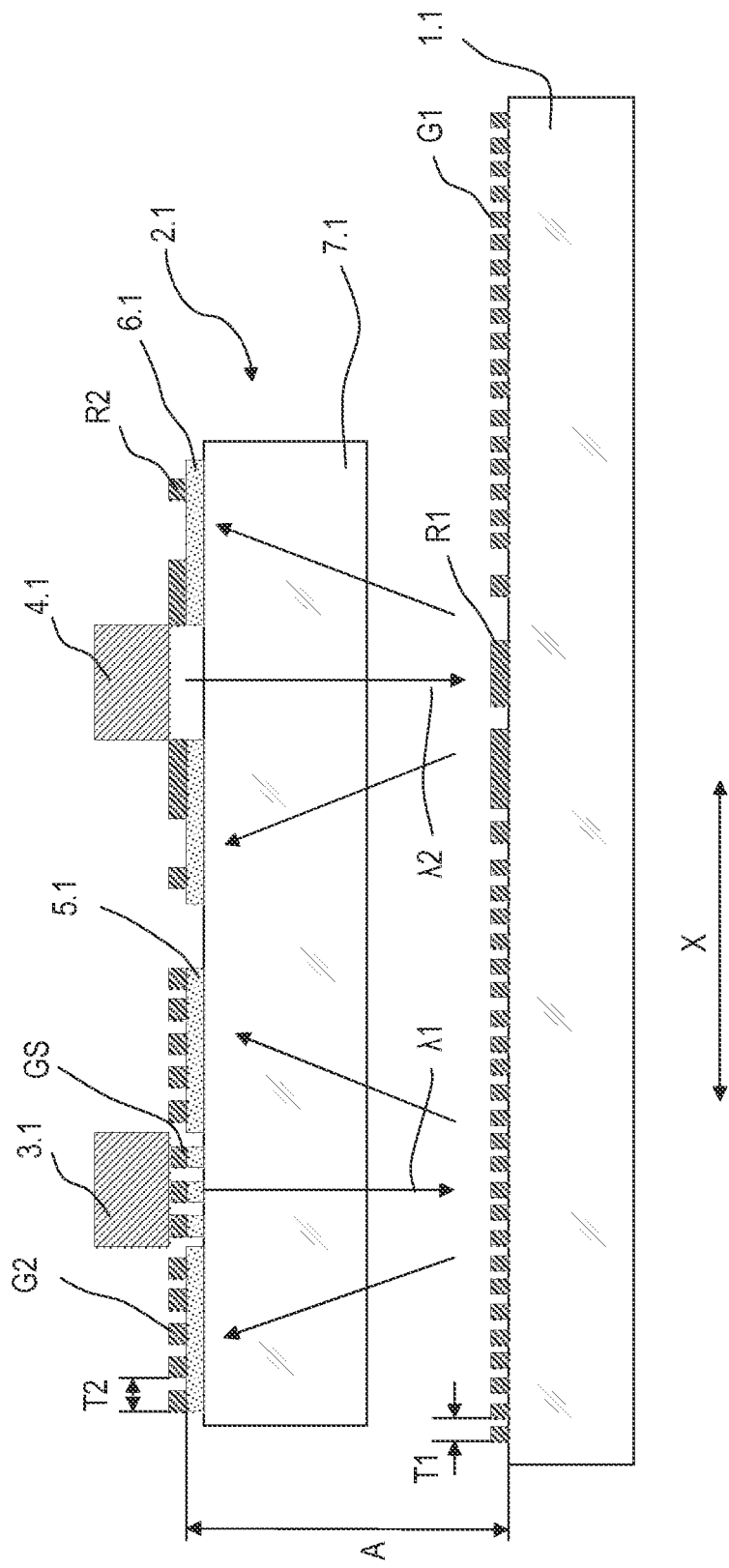
FIG. 1 is a longitudinal section through a first position-measuring device.

In an embodiment, the present invention provides an optical position-measuring device that obtains as high a degree of modulation as possible for both incremental and absolute position measurement. The position-measuring device is designed to be as compact as possible and tolerant to changes in the scanning distance.

These objectives are achieved by using light of a first wavelength for incremental position measurement and light of a second wavelength for absolute position measurement, the first wavelength being shorter than the second wavelength.

The above-mentioned dependency of the scanning distance on the wavelength of the light used is exploited in embodiments of the invention in a particularly advantageous manner. Light having as short a wavelength as possible is used for incremental position measurement. This has the advantage that the first Talbot plane (n=1) occurs at a distance where the second grating can be placed easily. Therefore, it is advantageous for the first and second gratings to be configured and illuminated in such a way that the Talbot effect occurs behind the first grating, and the second grating is located at a scanning distance from the first grating, which distance corresponds to the first Talbot distance, so that the second grating is located in the first Talbot plane with n=1.

In contrast, for absolute position measurement, light of a longer wavelength is used.

A simple design is obtained for the position-measuring device when using detector elements of the same type for incremental position measurement and absolute position measurement. The first and second detector arrays then have the same spectral sensitivities.

Preferably, a first monochromatic light source is provided for generating light of the first wavelength, and a second monochromatic light source is provided for generating light of the second wavelength.

In order to achieve a particularly compact and easily manageable design, the first light source, the second light source, the first detector array, and the second detector array are disposed together on an upper side of a transparent carrier substrate such that the light-emitting sides of the light sources and the light-sensitive sides of the two detector arrays are oriented toward the measuring standard.

The spectral sensitivity of the two detector arrays is, for example, higher for the second wavelength than for the first wavelength.

A particularly simple design is obtained when the detector arrays are formed using amorphous silicon. The maximum spectral sensitivity of amorphous silicon is at about 570 nm. Here, the first wavelength is preferably selected to be less than 520 nm. In particular, the first wavelength is in the range from 430 nm to 500 nm, and the second wavelength is in the range of 570 nm±50 nm.

However, the detector arrays may also be formed using crystalline silicon. Here, the first wavelength; i.e., the light used for incremental measurement, is preferably selected to be less than 700 nm, in particular about 600 nm, and the second wavelength; i.e., the light used for absolute measurement, is selected to be about 870 nm±50 nm.

The present invention can in principle be used for both transmitted-light scanning and reflected-light scanning. In transmitted-light scanning, the illumination is provided by light sources disposed on one side of the measuring standard, whereas the detector arrays are disposed on the other side of the measuring standard, and therefore the measuring standard must be transparent to the wavelengths used. In contrast, reflected-light scanning exploits the reflection characteristics of the measuring standard in that the detector arrays are disposed on the same side as the light sources. Reflected-light scanning is particularly suitable for obtaining a position-measuring device of compact design. Therefore, the present invention will be explained in more detail below with reference to two exemplary embodiments in which reflected-light scanning is used.

FIG. 1 shows a longitudinal cross-sectional view of a first embodiment of an optical position-measuring device designed in accordance with the present invention. The position-measuring device has a measuring standard 1.1 and a scanning unit 2.1 displaceable relative thereto in a measuring direction X. Measuring standard 1.1 has a first grating G1 in the form of a periodic incremental graduation for incremental position measurement. Furthermore, measuring standard 1.1 has an absolute mark R1 for absolute position measurement. In the example shown, absolute mark R1 is a reference mark having an irregular array of lines which uniquely defines a single position within the measurement range. In the example shown, absolute mark R1 is a mark which is integrated into first grating G1 as an aperiodic disturbance in the sequence of periodic graduation lines that makes up first grating G1.

However, absolute mark R1 may also be disposed in a separate track spatially adjacent to first grating G1. Further, the absolute mark may be a code arranged in measuring direction X, in particular a PRC, which defines a unique absolute position at any position within the measurement range.

The incremental position measurement illustrated in the example is based on the so-called "three-grating encoder" principle. Here, first grating G1 of measuring standard 1.1 is illuminated with the aid of a further grating GS, referred here as transmitting grating GS. Scanning unit 2.1 has a further grating G2, referred here as second grating G2, which is arranged to scan the image of first grating G1 produced at scanning distance A.

This three-grating encoder principle uses transmitting grating GS to split up the light from first light source 3.1, theoretically resulting in the following Talbot planes:

$$L_n = n \times T1 \times T2 / \lambda 1$$

n: an integer number 0, 1, 2, . . .
T1: grating constant of first grating G1
T2: grating constant of second grating G2
$\lambda 1$: wavelength of the light used for incremental scanning
With T2=2×T1, the following is obtained:

$$L_n = n \times 2 \times T1^2 / \lambda 1$$

Figure 3:
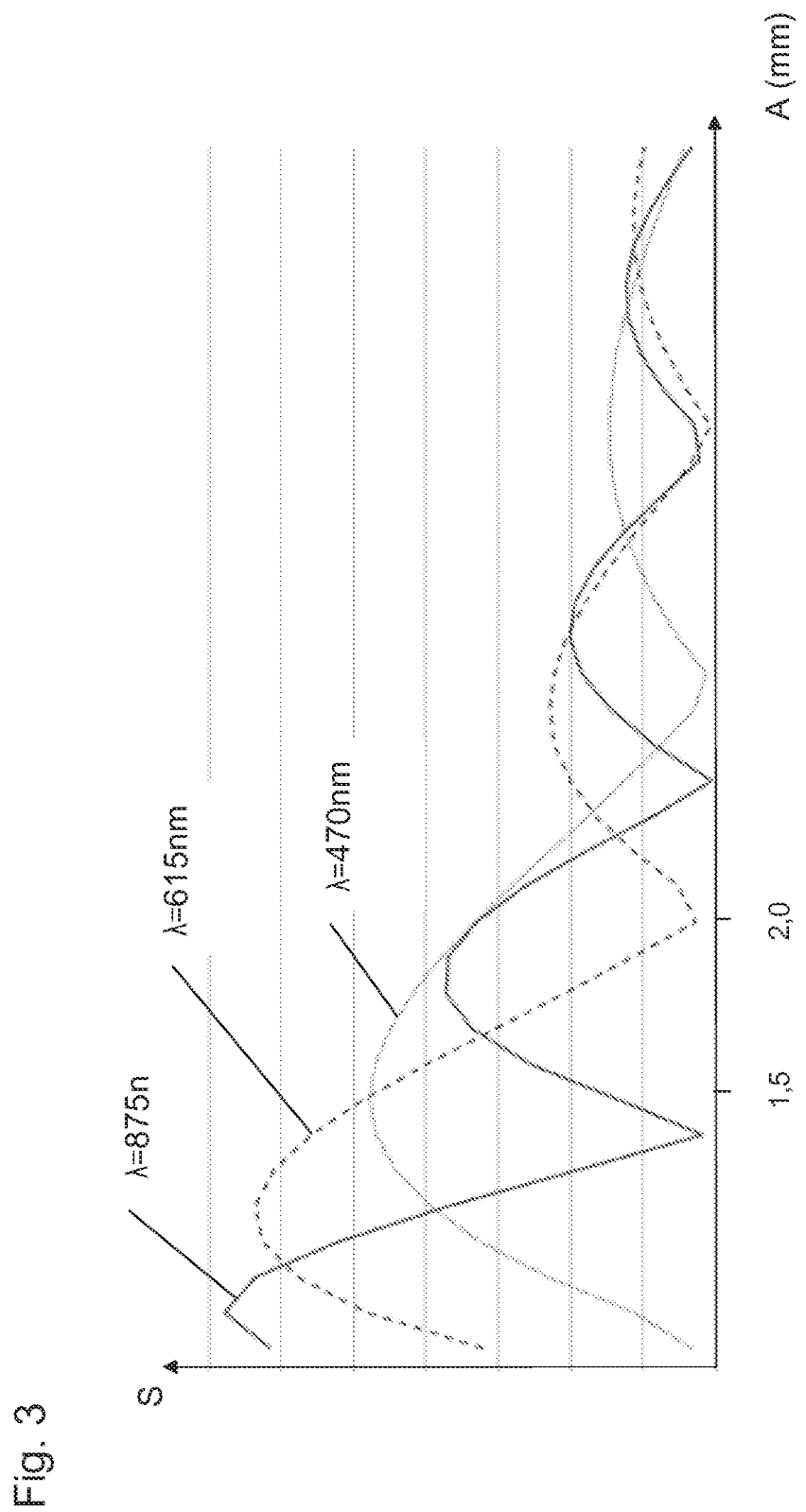
FIG. 3 shows the variation of the amplitude of the incremental scanning signal as a function of the wavelength used.

FIG. 3 shows the variation of the amplitude S of the incremental scanning signal as a function of the wavelength $\lambda$ used. The curves illustrate the variation in the signal amplitudes that actually occurs in the configuration shown in FIG. 1. For a grating constant T1=20 µm, the first Talbot plane (n=1) is located at a scanning distance A of about 1.5 mm when light with a wavelength $\lambda 1$=470 nm is used. If scanning distance A is selected to correspond to the location of the first Talbot plane (n=1), then, on the one hand, a relatively high signal amplitude is produced and, on the other hand, a change in scanning distance A results in a relatively small change in the amplitude. The assembly tolerances of the position-measuring device, and the permissible tolerances during operation, which may result, for example, from temperature changes, are therefore relatively large.

In the present invention, the dependency of the Talbot distances on the wavelength $\lambda 1$ of the light used is optimally exploited. For high-accuracy position measurement, the gratings G1 used for the measuring standard 1.1 are required to have as small a grating constant T1 as possible. By reducing the grating constant T1, the Talbot distances are also reduced. By reducing the Talbot distances, the permissible tolerances for scanning distance A are also reduced. In accordance with the present invention, in order to achieve a scanning distance A that is easy to implement from a mechanical point of view, light having as short a wavelength $\lambda 1$ as possible is used for incremental position measurement.

It is apparent from FIG. 3 that the distances of the Talbot planes increase with decreasing wavelength $\lambda$ of the light used. The sensitivity to changes in distance is lower for short wavelengths $\lambda$ than for longer wavelengths $\lambda$. In the present invention, the wavelength $\lambda 1$ used for incremental scanning is even allowed to be outside of the maximum spectral sensitivity of the detector array 5.1 associated therewith, hereinafter referred to as first detector array 5.1.

Absolute position measurement is performed using a wavelength $\lambda 2$ greater than the wavelength $\lambda 1$ used for incremental scanning. If first detector array 5.1 and second detector array 6.1 are constructed identically, then their spectral sensitivities exhibit the same variation with wavelength $\lambda$.

Figure 4:
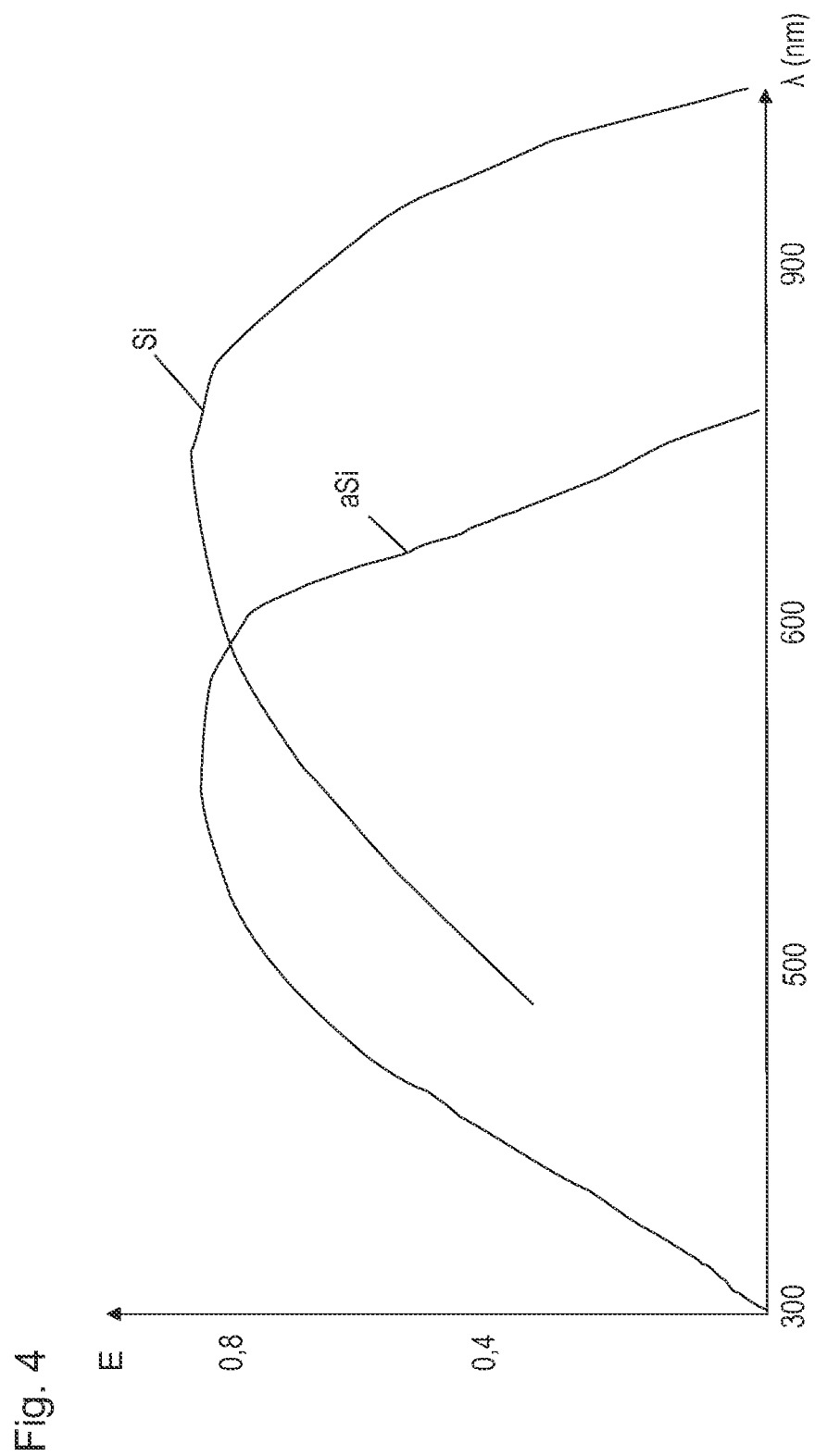
FIG. 4 shows the variation of the spectral sensitivity E of an amorphous silicon (aSi) based detector array and of a crystalline silicon (Si) based detector array as a function of the wavelength $\lambda$.

The two detector arrays 5.1, 6.1 may be formed, for example, using amorphous silicon. In FIG. 4, the variation of the spectral sensitivity E of amorphous silicon (aSi) based detector arrays 5.1, 6.1 is shown as a function of the wavelength $\lambda$ of the light used. The maximum spectral sensitivity is at about 570 nm. Here, light having a wavelength $\lambda 2$ in the range of 570 nm±50 nm is advantageous for absolute scanning. Then, for incremental scanning, it is advantageous to use light with a wavelength $\lambda 1$ below 520 nm, in particular in the range from 430 nm to 500 nm, in order to achieve the desired scanning distance A of more than 1 mm. In this connection, the wavelength λ1 used for incremental imaging is allowed to be outside of the maximum spectral sensitivity of detector array 5.1.

In the example shown, the wavelengths λ1, λ2 used for the two types of scanning are matched to the spectral sensitivity profile E of detector arrays 5.1 and 6.1 in such a way that the spectral sensitivity to second wavelength λ2 is higher than the spectral sensitivity to first wavelength λ1. Thus, for absolute scanning, the spectral characteristics of detector array 6.1 are fully exploited in that the second wavelength λ2 is at, or at least near, the maximum of the spectral sensitivity profile E.

In general terms, the second wavelength λ2 used for absolute scanning is preferably selected to be equal to the maximum spectral sensitivity of the detector array 6.1 assigned for this type of scanning, preferably with a tolerance of ±50 nm. The wavelength λ1 used for incremental scanning is selected to be shorter than that.

First detector array 5.1, which is used for incremental scanning, is preferably configured as a so-called "structured detector array" in that second grating G2 is integrated into the layered structure of the photosensitive detectors. In known manner, a plurality of groups of detector arrays 5.1 may be provided, arranged and interconnected in such a way that a plurality of mutually phase-shifted scanning signals can be derived. For further details on the implementation of the incremental scanning, reference may be made, for example, to EP 1 695 391 B1.

In the example shown, second detector array 6.1, which is used for absolute scanning, is also configured as a structured detector array in that the structure R2 used for scanning absolute mark R1 is integrated into the layered structure of the photosensitive detectors.

Detector arrays 5.1, 6.1 are preferably disposed together on an upper side of a transparent carrier substrate 7.1, which side faces away from measuring standard 1.1. First light source 3.1, second light source 4.1, first detector array 5.1, and second detector array 6.1 are disposed on the upper side of transparent carrier substrate 7.1 in such a way that the light-emitting sides of light sources 3.1 and 4.1 and the light-sensitive sides of detector arrays 5.1 and 6.1 are oriented toward measuring standard 1.1.

Figure 2:
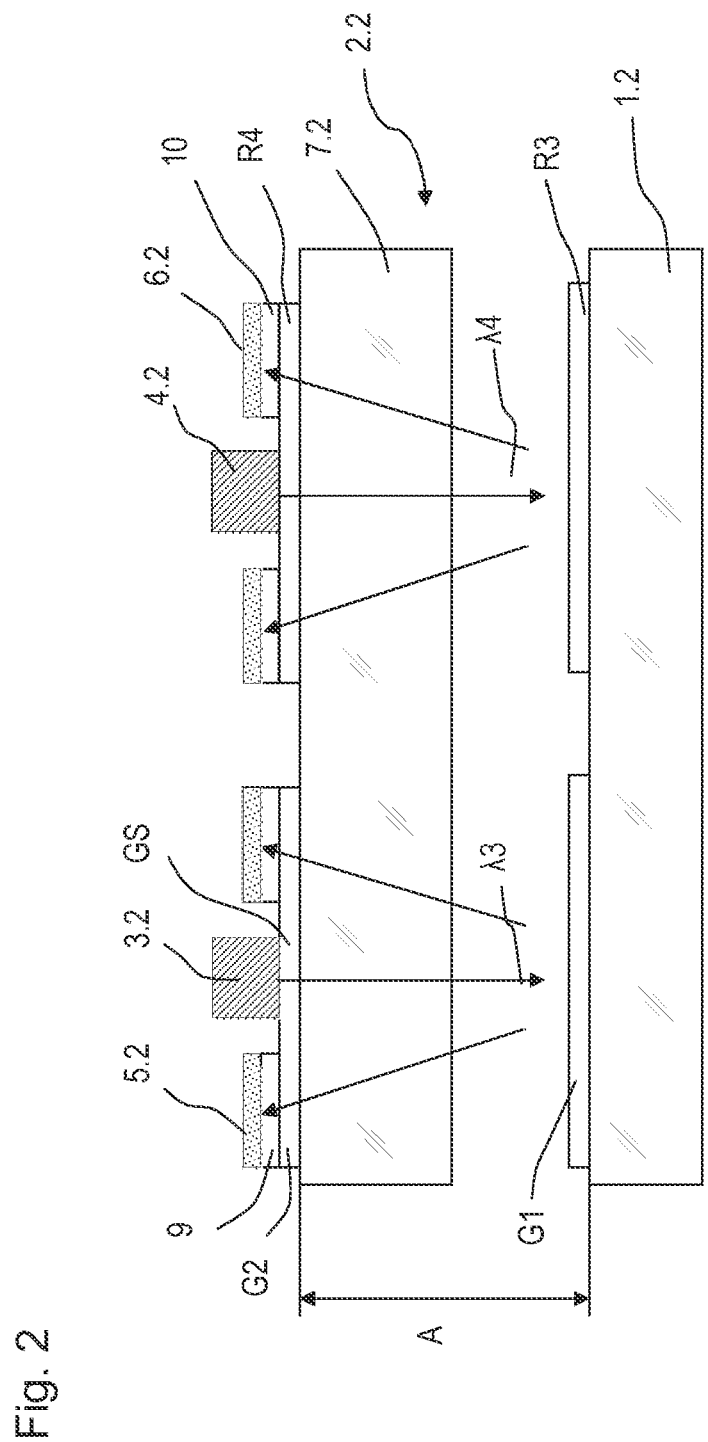
FIG. 2 is a transverse section through a second position-measuring device.

FIG. 2 illustrates a second exemplary embodiment of the present invention. In this exemplary embodiment, absolute mark R3 is disposed spatially adjacent to first grating G1 on measuring standard 1.2.

The detector array 5.2 used for incremental measurement and the detector array 6.2 used for absolute measurement are again disposed together on an upper side of transparent carrier substrate 7.2, which side faces away from measuring standard 1.2. First light source 3.2, second light source 4.2, first detector array 5.2, and second detector array 6.2 are disposed on the upper side of transparent carrier substrate 7.2 in such a way that the light-emitting sides of light sources 3.2 and 4.2 and the light-sensitive sides of detector arrays 5.2 and 6.1 are oriented toward measuring standard 1.2.

In this example, detector arrays 5.2 and 6.2 of scanning unit 2.2 are formed on the basis of crystalline silicon (Si). The spectral sensitivity profile E of these detector arrays 5.2 and 6.2 is shown in FIG. 4. The maximum spectral sensitivity is at a wavelength λ of about 870 nm. The light used for absolute measurement; i.e., the second wavelength λ4 of second light source 4.2, is therefore selected to be about 870 nm±50 nm. Here, first wavelength λ3; i.e., the light from light source 3.2, which is used for incremental measurement, is preferably selected to be less than 700 nm, in particular about 600 nm.

The use of different wavelengths λ1, λ2 and λ3, λ4, respectively, additionally offers the possibility of using filters to prevent mutual interference between the two scanning channels (incremental scanning and absolute scanning) A possible arrangement of such filters 9 and 10 is shown in FIG. 2. First detector array 5.2 has associated therewith a first filter 9 that is transparent to light components having the first wavelength λ3 and opaque to light components having the second wavelength λ3. Filter 9 is disposed between second grating G2 and the light-sensitive areas of detector array 5.2. Second detector array 6.2 has associated therewith a filter 10 that is transparent to light components having the second wavelength λ4 and opaque to light components having the first wavelength λ3. Filter 10 is disposed between second detector array 6.2 and the structure R4 for scanning absolute mark R3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device, comprising:
   a measuring standard having a first grating in a form of a periodic incremental graduation and an absolute mark;
   a scanner displaceable relative to the measuring standard in a measuring direction, the scanning unit having at least one second grating disposed at a scanning distance from the first grating;
   a first detector array configured to obtain a first scanning signal for purposes of position determination in which the gratings are illuminated with light of a first wavelength; and
   a second detector array configured to obtain a second scanning signal for purposes of position determination in which the absolute mark is illuminated with light of a second wavelength, the first wavelength being shorter than the second wavelength.

2. The optical position-measuring device as recited in claim 1, wherein the first detector array and the second detector array each have a spectral sensitivity which exhibits a same variation with wavelength, and wherein the spectral sensitivity to the second wavelength is higher than the spectral sensitivity to the first wavelength.

3. The optical position-measuring device as recited in claim 1, wherein the second wavelength lies within a range of a maximum spectral sensitivity of the second detector array ±50 nm.

4. The optical position-measuring device as recited in claim 1, wherein the first wavelength is less than 520 nm.

5. The optical position-measuring device as recited in claim 1, wherein the first detector array and the second detector array are formed using amorphous silicon.

6. The optical position-measuring device as recited in claim 5, wherein the first wavelength is in a range from 430 nm to 500 nm and the second wavelength is in a range of 570 nm ±50 nm.

7. The optical position-measuring device as recited in claim 1, wherein the first detector array and the second detector array are formed using crystalline silicon, and wherein the first wavelength is less than 700 nm and the second wavelength is in a range of 870 nm ±50 nm.

8. The optical position-measuring device as recited in claim 1, wherein the first grating and the at least one second grating are configured and illuminated such that the Talbot effect occurs behind the first grating, and wherein the scanning distance of the at least one second grating from the first grating corresponds to a first Talbot distance.

9. The optical position-measuring device as recited in claim 1, wherein the light of the first wavelength is generated by a first light source and the light of the second wavelength is generated by a second light source, wherein the first light source, the second light source, the first detector array and the second detector array are disposed together on a transparent carrier substrate.

10. The optical position-measuring device as recited in claim 9, wherein the first light source, the second light source, the first detector array and the second detector array are disposed on an upper side of the transparent carrier substrate such that light-emitting sides of the light sources and light-sensitive sides of the detector arrays are oriented toward the measuring standard.

11. The optical position-measuring device as recited in claim 1, further comprising a first filter associated with the first detector array and a second filter associated with the second detector array, the first filter being opaque to light components having the second wavelength and the second filter being opaque to light components having the first wavelength.

12. A method optically measuring position, comprising:
  providing a measuring standard having a first grating in a form of a periodic incremental graduation and an absolute mark;
  disposing a scanner so as to be displaceable relative to the measuring standard in a measuring direction, the scanning unit having at least one second grating disposed at a scanning distance from the first grating;
  illuminating the gratings with light of a first wavelength and obtaining, by a first detector array, a first scanning signal for purposes of position determination; and
  illuminating the absolute mark with light of a second wavelength and obtaining, by a second detector array, a second scanning signal for purposes of position determination, the first wavelength being shorter than the second wavelength.

* * * * *